United States Patent

Donohoo

[15] 3,659,280

[45] Apr. 25, 1972

[54] COMMUNICATION SYSTEM USING THE ELECTRICAL POWER DISTRIBUTION NETWORK OF A BUILDING

[72] Inventor: Daniel J. Donohoo, Shoreview, Minn.

[73] Assignee: Dantronics Inc., Saint Paul, Minn.

[22] Filed: Nov. 20, 1967

[21] Appl. No.: 684,355

[52] U.S. Cl. ....................................340/310, 333/70, 333/76

[51] Int. Cl. ....................................H04m 11/04, H03h 7/10

[58] Field of Search ....................333/70, 76; 340/310, 416

[56] References Cited

UNITED STATES PATENTS

| | | | |
|---|---|---|---|
| 1,227,113 | 5/1917 | Campbell | 333/70 |
| 1,968,237 | 7/1934 | Weyers | 333/70 |
| 1,971,911 | 8/1934 | Herzog | 333/70 |
| 3,283,316 | 11/1966 | Beardmore et al. | 340/310 |
| 3,467,835 | 9/1969 | De Cola | 340/310 |

*Primary Examiner*—Eli Lieberman
*Attorney*—Daniel J. Meaney, Jr.

[57] ABSTRACT

A communication system adapted for use with a building's alternating current voltage electrical distribution system is shown wherein a high frequency signal can be transmitted over the electrical distribution system to a remotely disposed receiver electrically connected to the electrical distribution system and the receiver selectively responds to the high frequency signal by actuating an output circuit.

14 Claims, 9 Drawing Figures

INVENTOR.
DANIEL J. DONOHOO
BY
Daniel J. Meaney Jr
ATTORNEY

INVENTOR.
DANIEL J. DONOHOO
BY
Daniel J. Meaney Jr.
ATTORNEY

INVENTOR.
DANIEL J. DONOHOO
BY
Daniel J. Meaney Jr.
ATTORNEY

INVENTOR.
DANIEL J. DONOHOO
BY Daniel J. Meaney Jr.
ATTORNEY

COMMUNICATION SYSTEM USING THE ELECTRICAL POWER DISTRIBUTION NETWORK OF A BUILDING

It is known to utilize a transmitter and receiver for transmitting and receiving electrical signals over an electrical distribution system of a building. For example, a wireless intercom system produced by Allied Radio Company, identified as Knight KG–225 Transistor Wireless Intercom, utilizes a modulated high frequency signal for transmitting a voice communication between remotely disposed stations. Each station of the intercom system is selectively capable of transmitting or receiving an electrical signal.

It is further known to utilize the electrical distribution system in a building for selectively transmitting an unmodulated high frequency signal. For example, a fire alarm system disclosed in U.S. Pat. No. 3,274,578 transmits an unmodulated high frequency signal to a receiver over a building distribution system. A copending application Donohoo Ser. No. 562,599, filed July 5, 1966, now abandoned, entitled Fire Alarm And Protection System Utilizing A Low Voltage Distribution System Carrier Frequency, is another system which operates by transmitting an unmodulated high frequency signal which modulates the 60 cycle carrier signal.

Other known prior art devices have utilized the electrical distribution system for signal transmission. For example, one Electric Alarm Device for sensing signals over a power distribution system is disclosed in U.S. Pat. No. 3,136,985. Another Power Line Signal system having a relay controlled indicator at the receiver is disclosed in U.S. Pat. No. 3,283,316 Automatic Civil Emergency Warning Systems, Disaster Warning Systems and National Emergency Repeater Alarm (NEAR) Systems which are responsive to high frequency signals impressed on the entire power distribution are disclosed in several patents, for example, U.S. Pat. Nos. 3,130,396; 2,915,743; 3,148,365; 3,264,628; 3,264,634; and 3,284,791. Other prior art devices include a remote signal device for appliances described in U.S. Pat. No. 3,334,340 and an Automatic Power Meter Reading Over Neutral Power Transmission Line disclosed in U.S. Pat. No. 3,264,633.

Each of the prior art devices have serious disadvantages. For example, in the known prior art poor performance results when one of the stations or devices is located on a different side of the power line of the same phase relative to the other station or transmitting device. Resultingly, the transmitted signal impressed upon one side of the power line from one station or transmitting device is so attenuated that in some situations a remotely disposed station on the opposite side of the power line is unable to respond to the transmitted signal.

In one of the fire alarm system, a similar problem is encountered. When the high frequency oscillator is triggered, the resulting high frequency signal may not be selectively passed to the opposite power line to actuate the receiver.

It is realized that 220 volt appliances, such as for example a 220 volt motor, heating coils of an electric hot water heater or heating coils from a range, may be capable of conducting a portion of the high frequency signal to the opposite line. However, if an appliance is not operative at the time the signal is transmitted, it is possible that the transmitted signal will not be impressed upon an opposite power line and the receiver would not be actuated.

In Donohoo Ser. No. 562,599 abandoned and in U.S. Pat. Nos. 2,915,743 and 3,283,316, an attempt was made to solve this problem. In Donohoo Ser. No. 562,599 and in U.S. Pat. No. 3,283,316 a capacitor is connected between each side of the power line on the same phase. In U.S. Pat. No. 2,915,743 a capacitor is connected in series with an inductor across the secondary of a distribution transformer to form a tuned circuit between each side of the power line of the same phase. The capacitor or the capacitor in series with the inductor functions as a coupling filter to selectively apply the transmitted signal from one side of the power line onto the other side of the power line with a minimum amount of attenuation. In such apparatus or devices, the receiver is required to have very little sensitivity since the high frequency signal impressed thereon had a relatively high amplitude.

In Donohoo Ser. No. 562,599, and in U.S. Pat. Nos. 2,915,743 and 3,283,316, the receivers were low gain devices. The coupling filter between each side of the power line permitted the amplitude of the high frequency signal to be substantially greater than any other random noise, such as for example random noise generated by a brush-type motor or other noise generating devices. If the amplitude of the high frequency signal is not substantially greater than the amplitude of the random noise, the random noise would cause false operation of the system.

If noise suppression filters are utilized in the electrical distribution system, such as for example filters for suppressing noise from a television set in a home, the system and devices described in the above-noted patents may be completely unreliable in that undesired misoperations or non-operations may occur. In newer homes, the electrical distribution system within the house may include light dimming switches for controlling the intensity level of lamps. Generally, light dimmer control circuits include a variable resistor in combination with a capacitor and a diode for controlling conduction of an SCR transistor which determines lamp intensity. When the light dimmer switch is activated, signals having a wide spectrum are generated. Certain of the generated signals have an amplitude and frequency which are capable of triggering the receivers or devices described in the above-noted patents and Donohoo Ser. No. 562,599. Additionally, spurious firing of the receiver is affected by certain electrical devices energized from the same power line. For example, vacuum cleaners and pumps during start up, operation and deactuation generate spurious signals of an amplitude generally within the frequency and amplitude range capable of activating the receiver.

The system described in Donohoo Ser. No. 562,599 and in U.S. Pat. Nos. 2,915,743 and 3,283,316 requires that the coupling filter be mounted in the electrical distribution system of the building, usually adjacent to the main electrical distribution cabinet. Certain electrical codes require that the capacitor or capacitor and inductor be installed in a separate insulated housing which increases the installation costs of the system.

In U.S. Pat. No. 3,264,633, automatic meter reading is dependent using grounded neutrals and conduction through earth paths as the communication link.

The communication system of the present invention overcomes the disadvantage associated with each of the prior art devices.

In particular, the teachings of the present invention can be used in a system, device or receiver having wide utility such as for example in Fire Alarm Systems, Burglar Systems, Freezer Detection Systems, Civil Defense or NEAR Warning Systems, alarm devices, remote signal devices for appliances, automatic power meter reading devices and the like. In addition, the teachings of this invention can be used in systems wherein a continuous or coded single high frequency signal or a continuous or coded multifrequency high frequency signal or any combination thereof is impressed upon a power distribution system.

The communication system in one embodiment disclosed herein utilizes a transmitter and receiver each of which are particularly designed to operate with a high frequency signal having a very narrow frequency bandwidth and a relatively small amplitude. The transmitter includes an oscillator which can be triggered into operation under only certain conditions. Further, no coupling capacitors or the like are required to couple the signal between the power lines. The receiver has a specially designed filter which is capable of actuating the receiver when a high frequency signal of a very particular bandwidth and of a minimum amplitude is present on the power line energizing the receiver.

Generally, the high frequency signal being applied onto the power line by the transmitter is coupled to the opposite power line through the power transformer or in some cases by the energizing coil of a kilowatt power recording meter. In any event, the receiver is capable of responding to a signal which has been substantially attenuated, such as for example a signal which has been attenuated by a factor greater than 100. The receiver bandwidth response is selected to be relatively narrow. Since the receiver has a relatively narrow bandwidth response, an undesired but relatively similar signal whose frequency is a few per cent greater or less than the bandwidth of a desired signal transmitted by a transmitter is greatly attenuated and rejected by the receiver.

One advantage of the communication system of the present invention is that the transmitter and receiver can be selectively energized from and utilize a commercial power distribution system.

Yet another advantage of the present invention is that separate coupling capacitors and the like are not needed to apply a high frequency signal from one side of a power line to the other side of the power line.

A further advantage of the present invention is that the transmitter may be located on one phase of a power distribution system and the receiver may be located on the same or another phase of the same power distribution system.

Another advantage of the present invention is that the transmitter and receiver can be easily matched such that the receiver is responsive to the high frequency signal emanating from the transmitter while the receiver rejects all other signals which are slightly less than or greater than the desired high frequency signal.

Yet another advantage of the present invention is that in one embodiment the transmitter and receiver can be used as a sophisticated highly-reliable fire and intrusion system.

Another advantage of the communication system of the present invention is that in another embodiment the system can be used as a freezer temperature alarm system.

Yet another advantage of the present invention is that the transmitter and receiver can be used for selectively determining the presence of a predetermined condition wherein the transmitter is activated transmitting a signal which activates the receiver to perform a predetermined function when the transmitter is actuated.

These and other advantages of the present invention will become apparent when considered in light of the following descriptions of various embodiments of the communication system when considered together with the drawing wherein.

Briefly, this invention relates to a receiver and to a communication system utilizing the receiver adapted for use with the building's alternating current electrical distribution system. The receiver responds to an electrical signal impressed onto the electrical distribution system and the electrical signal has a predetermined frequency other than the carrier frequency of the electrical distribution system. The receiver includes input terminals which are adapted to be connected to the electrical distribution system. The input terminals are connected to a narrow band pass filtering means having a center bandwidth frequency which equals the predetermined frequency. The filtering means includes at least two shunt resonant stages and a single series resonant stage connected between and in parallel to the shunt resonant stages and a resistance means electrically connected across the output of the filtering means. Each of the resonant stages has the same resonant frequency. The filtering means is capable of passing the high frequency signal with minimum attenuation and all other signals with substantially greater attenuation whereby the signal-to-noise ratio of the passed high frequency signal is substantially greater than that of the received high frequency signal. An amplifying means is operatively coupled to the filtering means for amplifying the passed high frequency signal. A circuit means is operatively coupled to amplifying means and is responsive to the amplified high frequency signal for actuating an output device.

Figures 1, 2:
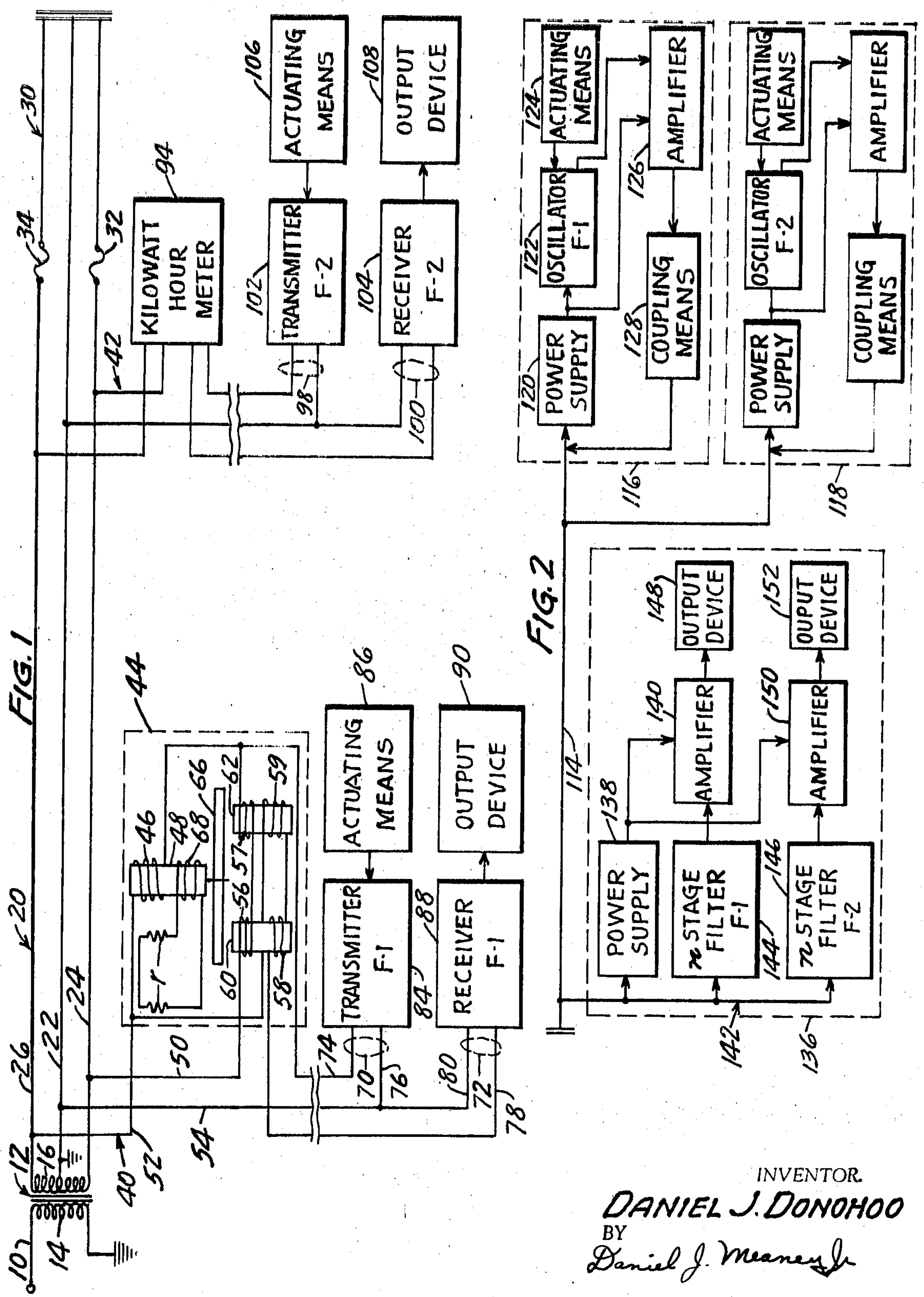
FIG. 1 is a block diagram partially in schematic diagram illustrating use of the transmitter and receiver in a building distribution system having a kilowatt hour meter wherein the building distribution system is energized from a power distribution system.
FIG. 2 is a block diagram illustrating one embodiment of the present invention wherein the circuit elements depict two transmitters each having a different predetermined high frequency signal and a multifrequency receiver.

FIG. 1 is a block diagram of a communication system of this invention. The communication system is operatively connected to a building electrical distribution system wherein a kilowatt hour meter is illustrated in a schematic diagram. Specifically, the communication system in its broadest aspects is energized by an alternating current voltage having a 60 cycle carrier frequency. The communication system disclosed herein is capable of use in a three phase power distribution system. However, for purpose of example, only a residential single phase distribution system will be considered. In conventional residential areas, a high voltage single phase primary circuit of a power distribution system, generally designated as 10, is used as a feeder for distributing power to a predetermined load. Typically, the feeder has sufficient power to supply a plurality of buildings which are normally energized from the same feeder of the power distribution system. The high voltage feeder is generally energized from a power source, such as for example a 2.4 KV source, a 4 – 4.16 KV source, a 12.0 – 13.8 KV source and the like. Only a single phase of a three phase power distribution system is needed to provide a normal 120/240 Volts (V.) electrical service to buildings, residences and the like. A single phase distribution transformer 12 connected to the desired single phase of the power system is used to supply the required voltage to a secondary low voltage bus. The transformer 12 has a primary winding 14 (hereinafter referred to as primary) and a secondary winding 16 (hereinafter referred to as secondary) with the turns ratio therebetween being a function of the primary voltage and the desired secondary voltage. For example, in a typical single phase 4 KV to 120/240 V. distribution system, a distribution transformer has a turns ratio in the order of 16:1. The distribution transformer primary 14 may or may not have adjustable taps to insure that the voltage appearing across the secondary 16 is in the order of 120/240 V. In a conventional power distribution transformer, a secondary bus, designated generally as 20, is connected across the secondary 16 of transformer 12. Usually, the secondary 16 has a center tap which is grounded. This ground is usually considered system neutral. In a 4 KV distribution area, the neutral conductor 22 in secondary bus 20 is usually selected to be the center conductor. In other primary voltage areas, such as for example in a 13.8 KV voltage area, the neutral is selected to be the top conductor in the three-wire secondary bus 20. The voltage across the entire secondary 16 is conventionally 120/24 volts a.c.

In a conventional 4 KV primary voltage area, the two leads of a secondary bus 20 connected to the transformer secondary 16 are designated as conductors 24 and 26. Thus, in a conventional secondary bus 20 the voltage between the neutral conductor 22 and either conductor 24 or 26 is 120 V, 60 cycles a.c. Conversely, the voltage between the two energized conductors 24 and 26 is 240 V, 60 cycles a.c. If the same secondary bus is energized from a second power distribution transformer (not shown) connected to the same phase of the primary feeder, the low voltage secondary busses between transformers may be electrically connected together through secondary fuses. For example, a portion of the low voltage secondary bus, designated as 30, may be considered energized from such a secondary power distribution transformer. In such a case, the neutral conductors between each of the transformers can be connected electrically to each other and need not be fused. However, the energized conductors 24 and 26 are electrically connected via section fuses 32 and 34 respectively. Thus, any building energized from the secondary bus 20 will probably draw electrical current from both transformer 12 and any other distribution transformer electrically connected to the same low voltage secondary bus.

An electrical service to a building usually comprises three wires and generally is a 120/24 volt a.c. electrical service. For example, two electrical services, designated generally as 40 and 42, are energized from the low voltage secondary bus 20. Each electrical service 40 and 42 has two energized conductors and a neutral conductor which are connected to the corresponding energized conductors 24 and 26 and the neutral conductor 22 of secondary bus 20. A building's electrical distribution system is connected by means of a low voltage distribution circuit panel (not shown) of conventional design. However, the amount of electrical power used by a building is measured by means of a kilowatt hour meter, such as for example the kilowatt hour meter 44 illustrated as being energized from service 40. The kilowatt hour meter 44 may be any type of known meter. For purpose of example, a typical induction-type watt hour meter is considered in the ensuing description. Generally, the induction-type meter includes a potential coil 46 inductively coupled to a pole piece 48. The potential coil 46 is electrically connected between the two energized conductors, for example conductors 50 and 52 of electrical service 40. Ground conductor 54 provides a ground or neutral for the service 40. Two current coils, designated as 56 and 57, are electrically connected in series with one of the energized conductors 50. Also two current coils 58 and 59 are electrically connected in series with the other energized conductor 52. The current coils 56 and 57 inductively couple pole pieces 60 and 62 respectively in a predetermined direction so as to cause the magnetic field produced therein to be a selected direction and to have a flux density which is proportional to the current passing through conductor 50. Similarly, current coils 58 and 59 inductively coupled to pole pieces 60 and 62 respectively produce a magnetic field having a flux density which is proportional to the current passing through conductor 52. The pole pieces 60 and 62 are spaced from each other and from the pole piece 48 such that there is a gap therebetween. A perforated metallic disk 66 is located in the gap. Disk 66 is rotated in response to the magnetic fluxes established between the pole pieces 48, 60 and 62 due to the voltage in potential coil 48 and the currents within coils 56, 57, 58 and 59. The rotating metallic disk 66, through a gear driving mechanism (not shown), records the kilowatt hours of electricity used. A compensating coil 68 inductively couples pole piece 48 and functions to eliminate errors due to the fact that the power factor is less than unity.

Generally the driving torque on the disk 66 of a kilowatt hour meter is proportional to the power used in the building load or load circuit. The potential coil 46 has many turns and is therefore highly inductive so that the flux emanating from the potential pole piece 48 will lag almost 90° electrically behind the fluxes derived from the currents passing through conductors 50 and 52. Thus, the fluxes set up in pole pieces 60 and 62 are due to the line currents within conductors 52 and 54. The disk 66 is rotated by eddy currents produced therein by the flux from the potential coil 46 which is at a maximum at almost the same instant that the fluxes from the current coils 56, 57, 58 and 59 are at a maximum.

In the present invention, the potential coil 46 of a conventional kilowatt hour meter functions to couple a high frequency signal having a predetermined frequency between energized conductors within the building distribution system. Concurrently, the high frequency signal is impressed on the entire secondary bus and onto any other services energized from the same power distribution transformer.

Several alternating current electrical distribution circuits within a building are energized from services 40 and 42. For purpose of example, two typical circuits 70 and 72 are selected for discussion. Circuits 70 and 72 are illustrated as 120 V. circuits, each of which is energized from a different energized conductor. However, each circuit 70 and 72 has a common ground conductor. Specifically, circuit 70 has an energized conductor 74 which is electrically connected to and energized from energized conductor 50. Circuit 70 also has a ground conductor 76 which is electrically connected to the ground conductor 54 of the service 40.

Similarly, circuit 72 has an energized conductor 78 which is energized from an energized conductor 52 of service 40. A ground conductor 80 of circuit 72 is electrically connected to the ground conductor 54 of service 40 and to ground conductor 76 of circuit 70.

The communication system of the present invention includes a transmitter 84. Transmitter 84 is capable of being energized by an actuating means 86 and when so actuated generates and applies a high frequency signal having a predetermined frequency F1 onto the electrical distribution system or onto the electrical circuit 70 comprising conductors 74 and 76. The high frequency signal appearing between conductors 74 and 76 modulates the 60 cycle carrier of the alternating current voltage system at a frequency F1. The high frequency signal modulating the 60 cycle carrier is impressed between energized conductor 50 and ground conductor 54 of service 40. The high frequency signal is subsequently applied upon energized conductor 24 of the secondary bus 20. Potential coil 46 functions to couple the high frequency signal onto the other conductor 52 of service 40. Energized conductor 52 and transformer secondary 16 similarly impresses the high frequency signal onto energized conductor 26 of the secondary bus 20 and onto the other energized conductor 78 of service 72 serving a remote part of the same building. The circuit 72 has a receiver 88 electrically connected to conductors 78 and 80. The receiver 88 has a filtering means therein which detects the presence of the high frequency signal appearing on conductor 78. The receiver 88 in response to receiving the high frequency signal actuates an output device 90.

In this communication system, the receiver is responsive to a high frequency signal only when the transmitter 84 is actuated by actuating means 86.

For purposes of example, the second service 42 is illustrated as serving a second building from the same secondary bus 20. The service 42 has electrical power passing therethrough measured by a kilowatt hour meter 94 which may be similar to kilowatt hour meter 44. The second building is illustrated as having two circuits designated as 98 and 100. Circuits 98 and 100 energize a transmitter 102 and a receiver 104 respectively. The transmitter 102 also applies a high frequency signal onto its electrical distribution system but the frequency thereof is at a frequency F2 which is a different frequency than frequency F1 associated with transmitter 84. Similarly, the receiver 104 has a filtering means therein which is responsive only to the high frequency signal having a frequency F2 and which will reject the high frequency signal transmitted from transmitter 84 having a frequency F1.

The transmitter 102 is actuated by an actuating means 106 in a manner similar to the actuating means 86. The receiver 104 similarly actuates an output device 108 when the high frequency signal having a frequency F2 is received by receiver 104.

If desired, the receiver 88 shown connected to circuit 72 in building No. 1 could be conveniently connected to circuit 100 in building No. 2. Also, receiver 104 could be electrically connected to circuit 72 in building No. 1 rather than to circuit 100 in building No. 2 as illustrated. It is important to this invention that the high frequency signals transmitted by either transmitter 84 or 102 be at different predetermined frequencies if more than one system is operated off of the same power transformer. The high frequency signal is coupled between energized conductors by the potential coils of the kilowatt hour meters and by the secondary of the power distribution transformer. Such a communication system permits selective transmission of electrical signals between a plurality of transmitters and receivers. The bandwidth of the signal and the frequency response of the receiver are selected to be as close together as possible without the frequencies or pass bandwidth of the filtering means in each receiver overlapping.

Such a communication system finds utility as a fire and intrusion alarm system for building protection. For example, the actuating means 86 could well be a temperature sensor, an intrusion or burglary detector or a manually-operable means which is capable of rendering transmitter 84 operative. When the transmitter 84 is triggered, a high frequency signal is transmitted through the building's electrical distribution system. The high frequency signal having a predetermined frequency, say for example frequency F1, modulates a 60 cycle carrier. Subsequently the high frequency signal is applied to all receivers. Receiver 88, having a band pass frequency which is matched to the frequency F1, receives and is responsive to the high frequency signal. In this embodiment, the receiver 88 could be used to trigger an externally-mounted audible horn in place of output device 90. The receiver 88, in one embodiment, is responsive to the high frequency signal transmitted by the actuating means 86 triggering the transmitter 84 to actuate the output device 90. The output device 90 then remains operative even if the high frequency signal from transmitter 84 is cancelled.

FIG. 2 is a block diagram illustrating the components which comprise the basic transmitter and receiver. In FIG. 2, the building's electrical distribution system is generally designated as 114. Distribution system 114 is illustrated as having two transmitters 116 and 118 electrically connected thereto. Transmitter 116 is capable of transmitting a high frequency signal at a predetermined frequency F1 while transmitter 118 is capable of transmitting a high frequency signal at a frequency F2.

The basic construction of transmitters 116 and 118 is identical and for purposes of discussion transmitter 116 will be selected as exemplary. Transmitter 116 is energized by being plugged into a conventional outlet into the building distribution system. The 120 V, 60 cycle signal is applied to a power supply 120 which produces a direct current voltage for the remainder of the circuit components. The transmitter 116 includes an oscillator 122 which can be selectively triggered into operation by an actuating means 124, such as for example a temperature sensor. The oscillator 122, when rendered operative, generates the high frequency signal at a predetermined frequency F1 and the signal is amplified by an amplifier 126. The amplified high frequency signal is coupled back onto the power distribution system 114 by means of a coupling means 128.

Operation of transmitter 118 is identical to that of transmitter 116 and the high frequency signal impressed onto the distribution system 114 has a predetermined frequency F2. Both transmitters 116 and 118 can be operated independently or concurrently.

A single multifrequency receiver 136 receives both high frequency signals. The receiver 136 is electrically connected to the distribution system 114 by being plugged into a conventional outlet. The receiver 136 includes a power supply 138 which is used to supply the direct current voltage to amplifiers 140 and 150. Concurrently, a filtering means 142 of the receiver 136 is electrically connected to the power distribution system 114. The filtering means, designated generally as 142, includes a first n stage filter 144 tuned to a frequency F1. Similarly, the filtering means 142 includes a second *n* stage filter 146 tuned to a frequency F2. When either transmitter 116 or 118 transmits the high frequency signal, either filter 144 or 146 will detect the presence of the high frequency signal and apply the signal to amplifiers 140 and 150 respectively. Amplifier 140 upon receipt of a signal at frequency F1 will amplify the received signal and trigger an output device 148 indicating that a transmitter has been actuated. Similarly, amplifier 150 upon receipt of a signal at frequency F2 will amplify the received signal and trigger an output device 152.

Figure 3:
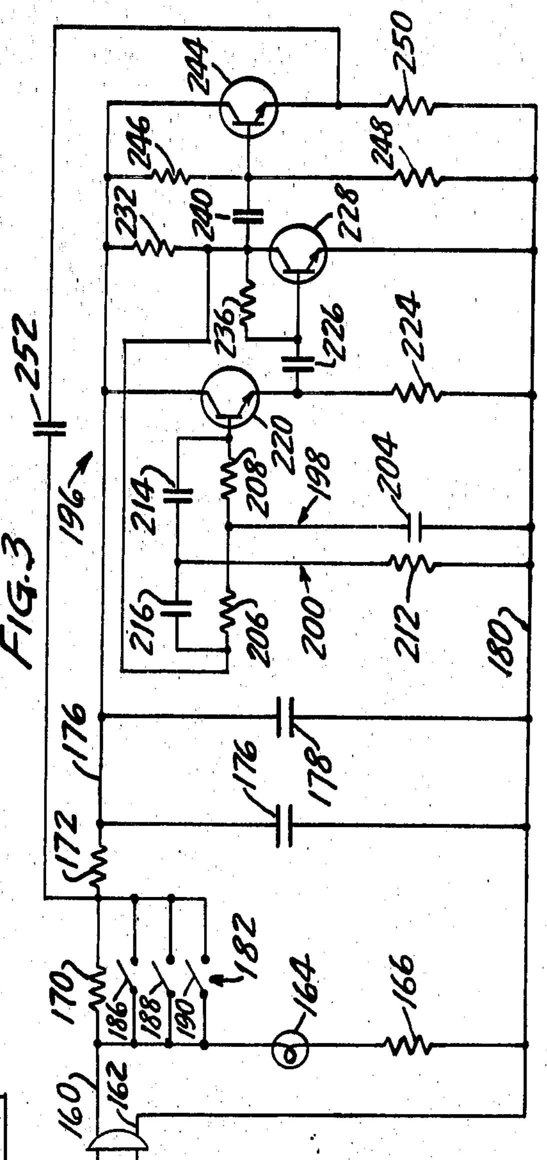
FIG. 3 is a schematic diagram of one embodiment of a transmitter adapted for use in the communication system of the present invention.

FIG. 3 is a schematic diagram illustrating one embodiment of a transmitter for use in the present invention. The transmitters are adapted to be electrically connected, by means of a conventional plug, into a conventional electrical outlet in a building distribution system. The alternating current voltage is applied to the transmitter across input terminals 160 and 162. An indicating lamp 164, electrically connected in series with a current limiting resistor 166, is energized by the a.c. voltage when the transmitter is energized. Thus, lamp 164 is illuminated any time the transmitter is plugged into and energized from the power system and functions as both a pilot light and an identification lamp to indicate that the system is energized. Resistor 166 in series with lamp 164 lowers the voltage applied across and the current through lamp 164. By use of a high ohmic value voltage dropping resistor 166, the lamp has a long life, say for example 10 years or more.

The power supply portion of the transmitter comprises a resistor 170 electrically connected to terminal 160, a resistor 172 having one end thereof electrically connected to said resistor 170, and a capacitor 174 electrically connected between the other end of resistor 172 and the input terminal 162. Capacitor 174 functions as a bypass capacitor to prevent spurious signals, such as interference and the like, from reaching the transmitter circuitry by passing the undesired signals back to the input terminal 162. A unilateral conducting device, such as a diode 176, is connected to the common junction terminal of resistor 172 and capacitor 174 and in a direction so as to convert the a.c. voltage into a pulsing direct current voltage. The direct current voltage is stored on a storage capacitor 178 connected between the diode 176 and a ground conductor 180. Capacitor 178 may be a low cost, electrolytic type of capacitor which is capable of maintaining a direct current charge thereon. Ground conductor 180 is electrically connected to the input terminal 162.

It is apparent that when resistors 170 and 172 are electrically connected in series circuit with the anode of diode 176, only a small direct current voltage is subsequently applied to and accumulated upon capacitor 178. However, the charge or direct current voltage appearing on capacitor 178 can be abruptly increased by shorting out the resistor 170. Resistor 170 can be bypassed by an actuatable means, generally designated as 182. Actuatable means 182 may comprise either a single, or a plurality of, normally-open contacts 186, 188 and 190. In one embodiment, contact 186 is from a temperature sensor, contact 188 is from an intruder detecting device and contact 190 is a manually-operable push button switch. In any event, when any one of the contacts 186, 188 or 190 is moved to a normally-closed position, the resistor 170 is bypassed. When resistor 170 is bypassed, a direct current voltage appearing on capacitor 178 immediately and abruptly increases in magnitude.

Typically, when resistor 170 is in the circuit, the voltage appearing across capacitor 178 may in the order of 2 or 3 volts d.c. However, when resistor 170 is selectively bypassed, by any of the actuatable means 182, the voltage on capacitor 178 abruptly increases to about 25 volts d.c.

The transmitter of FIG. 3 generally includes a high frequency oscillator, generally designated as 196. In this embodiment, the oscillator 196 comprises a twin T oscillator. The twin T oscillator has two T branches, a first T branch, generally designated as 198, and a second T branch, generally designated as 200.

The first T branch 198 comprises a capacitor 204 which is electrically connected to a common terminal between resistors 206 and 208. The second T branch 200 comprises a resistor 212, which resistor 212 is electrically connected between ground conductor 180 and a common terminal located between a capacitor 214 and a capacitor 216. The other terminal of capacitor 214 is electrically connected to the other end of resistor 208. Similarly, the other terminal of capacitor 216 is electrically connected to the other end of resistor 206.

The twin T arrangement provides a very selective means for controlling the frequency of the oscillator 196. The twin T arrangement herein utilizes an amplifier including NPN transistors 220 and 228 which function as inverter and amplification stages respectively. The amplifier provides a 180° phase shift which maintains precise oscillation of the high frequency oscillator.

The NPN transistor 220 has the base thereof electrically connected to the common terminal between resistor 208 of the first T branch 198 and capacitor 214 of the second T branch 200. The collector of transistor 220 is electrically connected to a power supply conductor 222 which in turn is electrically connected to the cathode of diode 176 and capacitor 178. The d.c. voltage appearing on power supply conductor 222 is determined by the voltage on capacitor 178. The emitter of transistor 220 is electrically connected via an emitter resistor 224 to ground conductor 180. Also connected to the emitter of transistor 220 via a coupling capacitor 226 is the base of NPN transistor 228. The emitter of transistor 228 is directly connected to ground conductor 180. The collector of transistor 228 is electrically connected to power supply conductor 222 by means of a collector resistor 232. Also, the collector of transistor 228 is electrically connected by means of a feedback resistor 234 to the common terminal between resistor 206 of the first T branch 198 and capacitor 216 of the second T branch 200. Also, the collector of transistor 228 is electrically connected to the base thereof by means of feedback resistor 236.

Briefly, the transistor 220 functions as an inverter stage and is essentially connected as an emitter-follower. The output appearing across emitter resistor 224 is coupled via capacitor 226 to the base of transistor 228. A feedback network electrically connects the output appearing across collector resistor 232 back onto the T branches 198 and 200. The twin T network provides a 180° phase shift such that the frequency of the oscillator 196 is continually and precisely defined.

The output from the collector of transistor 228 is coupled via a coupling capacitor 240 onto the base of an NPN transistor 244. The base operating voltage is established by a voltage dividing network comprising resistors 246 and 248. The collector of transistor 244 is directly connected to the power supply conductor 222. The emitter of transistor 244 is electrically connected via an emitter resistor 250 to ground conductor 180. The output signal appearing across emitter resistor 250 is an amplified high frequency signal and the magnitude thereof is a function of the current passing through transistor 244 and emitter resistor 250. The amplified high frequency signal is electrically coupled by means of a coupling capacitor 252 back onto the input terminal 160.

The amplified high frequency signal coupled by capacitor 252 is coupled onto the input terminal 160 by any of the closed actuatable means 182. Since it was necessary for either contact 186, 188 or 190 to be electrically closed to bypass resistor 170, this closed switch also serves to couple the signal back onto the input terminal 160.

When any of the contacts 186, 188 or 190 are actuated bypassing resistor 170, this causes an abrupt increase in the magnitude of the direct current voltage. The larger direct current voltage appearing on capacitor 178 is of a sufficient magnitude to properly bias transistors 220, 228 and 244 triggering the oscillator 196 into operation. Thus, the twin T oscillator 196 is a sure-start oscillator.

The frequency of the oscillator can be easily and quickly changed between a plurality of frequencies because of the twin T branches 198 and 200. By selectively changing the values of either the resistors or capacitors therein, the frequency signal generated by the oscillator 196 can be selectively shifted a fixed percentage. Typical values for one embodiment of a transmitter are listed hereinbelow:

| | |
|---|---|
| 164 | neon lamp, Chicago miniature— NE-2H |
| 166 | 1 meg Ω |
| 170, 212, 224 | 10 Ω |
| 172 | 560 Ω |
| 174, 226, 240 | 0.01 μf, 600 V. D.C. |
| 176 | 1N4003 |
| 178 | 400 μf, 25 V. D.C. |
| 204 | 680 pf |
| 206,208 | 15 KΩ |
| 214, 216 | 220 pf, 600 V. D.C. |
| 220, 228, 244 | 2N3569 |
| 232 | 3.3 KΩ |
| 236, 250 | 220 KΩ |
| 246, 248 | 47 KΩ |
| 252 | 0.1 μf, 400 V. D.C. |
| Voltage A.C. | 115 V., 60 Hz |
| D.C. Voltage | off — 2 V. D.C., or 25 V. D.C. |
| Frequency | 50 KHz |

Figure 4:
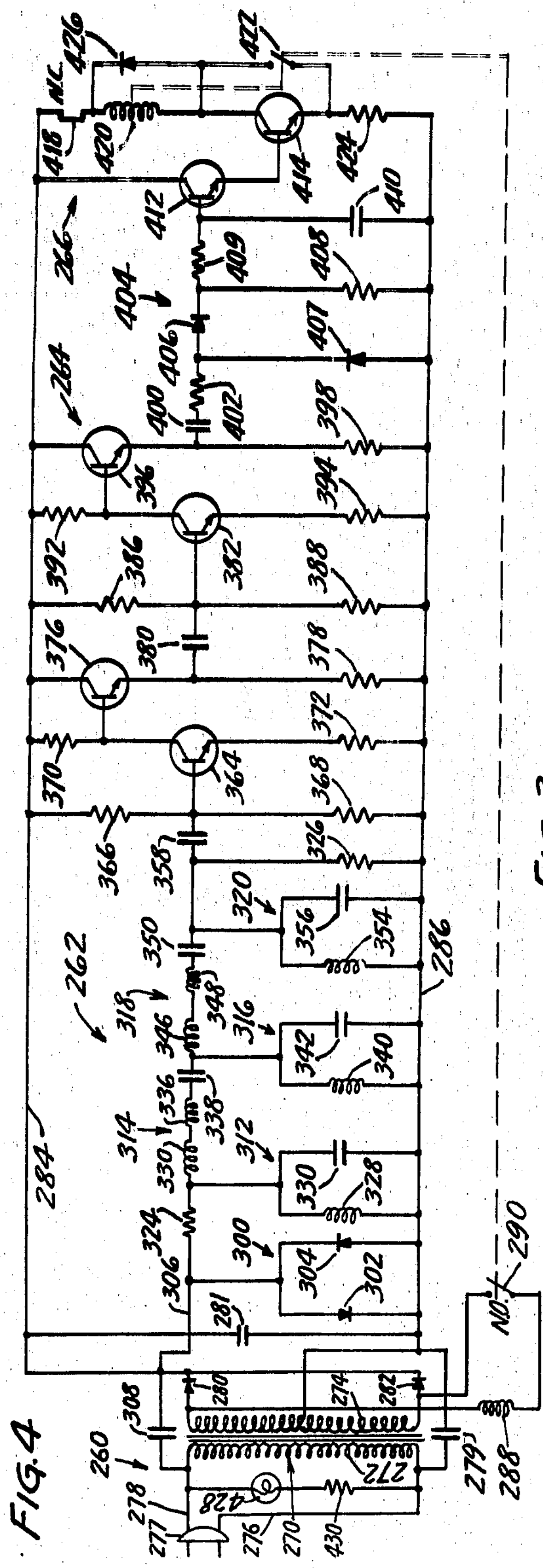
FIG. 4 is a schematic diagram of one embodiment of a receiver for use in a communication system of the present invention.

FIG. 4 is a schematic diagram of a receiver adapted for use with the present invention. Generally, the receiver comprises four sections. The first section is a power supply section, generally designated as 260, which includes a step-down transformer, diodes and capacitors. The power supply section 260 supplies a direct current voltage for the receiver while simultaneously providing a low voltage alternating current voltage for actuating an output device.

The second section is a filtering means, generally designated as 262. The third section includes an amplifying section, generally designated as 264. The fourth section comprises the actuation or triggering section, generally designated as 266, for actuating an output device.

The power supply section 260 generally includes a step-down transformer 270 having a primary winding 272 and a secondary, center tapped winding 274. The primary winding 272 has input terminals 276 and 278 which are adapted to be connected directly to a conventional electrical outlet in a building distribution system by means of a conventional electrical plug 277. The secondary winding 274 has the center tapped terminal electrically connected to input terminal 276 via a capacitor 279. The other terminals of the secondary winding 274 are electrically connected to the anodes of diodes 280 and 282. The cathodes of diodes 280 and 282 are electrically connected by a power supply conductor 284. A capacitor 281 functions as a filter capacitor for the direct current source and is electrically connected between a common ground conductor 286 and the power supply conductor 284. Ground conductor 286 is electrically connected via capacitor 279 to terminal 276. The diodes 280 and 282 together with the capacitor 281 provide a rectified direct current voltage which functions as the B+ for the receiver circuitry.

The low voltage secondary winding 274 of transformer 270 is also used to selectively energize an audible sounding device, such as for example a coil 288 of a vibratory-type horn. The coil 288 is connected in series with a normally-open contact 290. The series-connected coil 288 and normally-open contact 290 is connected across the output terminals of the transformer secondary winding 274 and is connected to the anodes of diodes 280 and 282. The normally-open contact 290 is mechanically interconnected or ganged to be operated by a relay which is responsive to the output circuitry of the receiver. In particular, when the receiver receives a predetermined high frequency signal transmitted by the transmitter, the receiver actuates the relay which in turn closes the normally-open contact 290. Operation of that portion of the receiver will be explained in detail hereinafter.

The filtering means 262 generally comprises a filter which is generally known as a "modified Tchebycheff filter." The theory of operation of such filters is described in a book entitled "Filter Theory and Practice" published by White Electromagnetic Corp. of Rockville, Maryland, identified by Library of Congress Number 6323232. The filtering means 262 can be generally characterized as a narrow band pass filtering means having a center bandwidth frequency equalling the predetermined frequency transmitted by the transmitting means, such as for example the transmitter circuitry of FIG. 3. The filtering means 262 includes a plurality of *n* stages each of which have passive elements and a center bandwidth equalling the predetermined frequency. The frequency means is capable of passing the high frequency signal with minimum attenuation and passing all other signals with substantial attenuation whereby the signal-to-noise ratio of the passed high frequency signal is substantially greater than that of any other undesired signal.

The filtering means 262 includes a clamping circuit, generally designated as 300, which includes two diodes 302 and 304. The diodes 302 and 304 are electrically connected in parallel to each other and between an input conductor 306 and the common ground conductor 286. The input conductor 306 is electrically connected via a capacitor 308 to the input terminal 278 which is located on one terminal of the primary winding 272 of transformer 270. The clamping circuit 300 functions to suppress noise and other high frequency signals having relatively high peak amplitudes such that only high frequency signals of a minimum amplitude, say in the order of 0.5 volts, are subsequently applied to the filtering means 262. The narrow band pass filtering means 262 has a center bandwidth frequency equalling a preselected or predetermined frequency transmitted by the transmitter. The filtering means 262 has at least two shunt resonant stages and at least one series resonant stage connected between and in parallel to the shunt resonant stages. A resistance means to control filter means loading is electrically connected across the output of the filtering means and in parallel to the shunt resonant stages. Each of the resonant stages has a resonant frequency equalling the predetermined frequency. The resonant stages in combination substantially reject the electrical signal having a frequency slightly different from the predetermined frequency while selectively passing electrical signals substantially at the predetermined frequency.

The narrow band pass filtering means 262 can be selected to reliably pass only the electrical signals at a preselected frequency. The embodiment of FIG. 4 has five resonant stages. However, it is possible that less than five stages may be used in certain applications having lesser requirements. Also, it is anticipated that in the case where high reliability is required, a filter having six or more stages may be used.

In the embodiment of FIG. 4, the narrow band pass filtering means 262 is illustrated to have five filter stages designated as 312, 314, 316, 318 and 320. Each of the filtering stages 312–320 has a resonant frequency equalling the preselected frequency of its associated filtering stage. Also, the narrow band pass filtering means 262 has a preselected centered bandwidth frequency which is selected to be equal to the frequency of the signal transmitted by a transmitter such as that of FIG. 3 over the electrical distribution system.

The filtering means 262 has two resistors 324 and 326 which are respectively located at the input and output of the filtering means. The resistors 324 and 326 function as resistance means for controlaby establishing filter loading. In the preferred embodiment, the values of the resistors 324 and 326 are matched.

The first filtering stage 312 has an inductor 328 and a capacitor 330 which are electrically connected in parallel to each other and between one end of resistor 324 and the common ground conductor 286. The resonant frequency of the filtering stage 312 is selected to be that of the resonant frequency of the filtering means 262.

The second filter stage 314 is a series resonant stage comprising inductors 334 and 336 and a capacitor 338. The resonant frequency of the series filtering stage 312 is selected to be equal to the resonant frequency of the entire filtering means 262.

The third filtering stage 316 is a parallel resonant circuit comprising an inductor 340 and a capacitor 342 electrically connected in parallel with each other and between one terminal of capacitor 338 and the common ground conductor 286.

The fourth filtering stage 318 is a series resonant circuit comprising inductors 346 and 348 and a capacitor 350. The series resonant filtering stage 318 is selected to have a resonant frequency equal to the frequency of the filtering means 262.

The fifth filtering stage 320 is a parallel resonant circuit comprising an inductor 354 connected in parallel with a capacitor 356 which are electrically connected between one terminal of capacitor 350 and the common ground conductor 286.

The electrical signals passed by the filtering means 262 is coupled by means of a coupling capacitor 358 to the amplifying portion of the receiver generally designated as 264.

The amplifying section 264 includes an NPN transistor 364 which has the voltage applied to the base thereof established by a voltage dividing network comprising resistors 366 and 368 which are electrically connected between the power supply conductor 284 and the common ground conductor 286. The collector of transistor 364 is electrically connected via a collector resistor 370 to the power supply conductor 284. The emitter of transistor 364 is electrically connected by means of an emitter resistor 372 to the common ground conductor 286. Transistor 364 performs the function of amplifying the relatively low voltage signal which is received by the filtering means 262. For example, the electrical signal when impressed upon the receiver would have an amplitude in the order of 200 millivolts and a frequency of about 50 KHz to ultimately actuate an output device controlled by the receiver.

In one embodiment, approximately 50 per cent of the signal was lost in the filtering means 262 such that in the order of 100 millivolts is applied to the base of transistor 364. The output voltage from the collector of transistor 364 would be in the order of 1 volt. The voltage appearing on the collector of transistor 364 is applied to the base of an NPN transistor 376 electrically connected as an emitter-follower. The collector of transistor 376 is connected directly to the power supply conductor 284 while the emitter of transistor 376 is electrically connected via an emitter resistor 378 to the common ground conductor 286. The emitter-follower utilizing transistor 376 is used to prevent loading of transistor 364.

The voltage appearing at the emitter of transistor 376 is electrically connected via a coupling capacitor 380 to the base of a high gain amplifier comprising an NPN transistor 382. A voltage dividing network comprising resistors 386 and 388 electrically connected between the power supply conductor 284 and the common ground conductor 286 establishes the base voltage for transistor 382. The collector of transistor 382 is electrically connected to the power supply conductor 284 via a collector resistor 392 while the emitter thereof is electrically connected via an emitter resistor 394 to the common ground conductor 286.

An emitter-follower comprising an NPN transistor 396 prevents loading of transistor 382. The base of transistor 396 is electrically connected to the collector of transistor 382. The collector of transistor 396 is connected to the power supply conductor 284. The emitter of transistor 396 is connected via an emitter resistor 398 to the common ground conductor 286.

A voltage in the order of 5 volts appears across the emitter resistor 398 in response to a voltage of approximately 200 millivolts being applied to receiver input terminals 276 and 278. The amplified filtered electrical signal is applied to a voltage doubler circuit 404. Circuit 404 includes a charging capacitor 400 and a current limiting resistor 402. In addition, the circuit 404 further includes a first diode 407 having its anode connected to the common ground conductor 286 and its cathode connected to resistor 402 and a second diode 406 having its anode connected to resistor 402.

Capacitor 400 charges, on each negative half cycle, to approximately the peak voltage at the frequency of the filtered signal applied to circuit 404. On each positive half cycle, the voltage on capacitor 400 electrically adds to the peak voltage of the signal during the positive half cycle resulting in a signal voltage of double amplitude at the cathode of diode 407. The double signal voltage at diode 407 during the positive half cycle is applied via diode 406 across a resistor 409 connected in series with a capacitor 410. The series connected resistor 409 and capacitor 410 are in parallel to a resistor 408. During each positive half cycle, capacitor 410 is charged an incremental amount which slightly increases the charge level thereof for each cycle of the electrical signal.

When the voltage or charge level on capacitor 410 reaches a predetermined level, a pair of NPN transistors 412 and 414, acting as a high impedance transistorized switch, are rendered conductive. When transistor 414 is rendered conductive, a circuit is completed from the power supply conductor 284 through a normally-closed push button 418, through a coil 420 of a relay having a contact 422 and contact 290, which contact 290 energizes coil 288 of the audible sounding device, through transistor 414 through an emitter resistor 424 to ground. When coil 420 is energized, normally-open contacts 422 and 290 are closed. Contact 422 functions as a sealing contact bypassing transistor 414 thereby keeping coil 420 energized until normally-closed push button 418 is actuated to its open position thereby de-energizing coil 420. A diode 426 is connected across coil 420 to shunt any back emf which is generated across the coil when the push button 418 is operated. An indicating lamp 428 connected in series with a resistor 430 across terminals 276 and 278 indicates that the receiver is receiving power.

In summary, when a high frequency signal of a predetermined frequency is received by input terminals 276 and 278, the signal is coupled by means of capacitor 308 to the narrow band pass filtering means 262. The filtering means 262 selectively passes the signal of predetermined frequency and rejects all other frequencies which are slightly different from the badn pass frequency. The signal transmitted by the filtering means 262 is amplified by at least one amplifier stage and in this embodiment comprises a dual transistor stage separated by emitter-followers. The amplified signal is then applied to a voltage doubling circuit which includes a capacitor 410 which accumulates a charge thereon from the transmitted electrical signal. After the predetermined time interval, say for example in the order of one second, the voltage appearing across capacitor 410 reaches a triggering voltage which is applied to the base of transistor 412 driving transistors 412 and 414 into conduction. Transistor 414 upon being rendered conductive energizes coil 420 of a relay which in turn seals itself in and energizes the coil 288 of the audible device by means of contact 290. The coil 288 remains energized until the normally-closed push button 418 is moved to its open position de-energizing coil 420. Thus, it is apparent that once the transmitter of FIG. 3 has transmitted the high frequency signal, the receiver will continue to actuate the alarm device, such as for example the audible horn, until the circuit is manually deactuated.

Typical component values for one embodiment of a receiver are set forth hereinbelow:

| | |
|---|---|
| 274 | **115/24** V., transformer |
| 279, 308, 330, 342, 356 | **0.01** μf, 600 V. D.C. |
| 280, 282 | 1N4002 |
| 281 | **500** μf, 25 V. D.C. |
| 288 | 24 V. A.C. vibratory horn |
| 302, 304, 406, 407, 426 | 1N456 |
| 324, 326 | **6.8** KΩ |
| 328, 340, 354 | **1** mh |
| 334, 336, 346, 348 | **50** mh |
| 338, 350 | **100** pf, 600 V. D.C. |
| 358, 380, 400 | **0.001** μf, 600 V. D.C. |
| 364, 376, 382, 396, 412, 414 | 2N3567 |
| 366, 386 | **1.5** meg Ω |
| 368, 388 | **100** KΩ |
| 370, 392 | **15** KΩ |
| 372, 394 | **330** Ω |
| 378, 398 | **47** KΩ |
| 402 | **1** KΩ |
| 408, 409, 430 | **1** meg Ω |
| 410 | **1.0** μf, 25 V. D.C. |
| 420 | **12** V. D.C. relay |
| 424 | **150** Ω |
| 428 | neon lamp, Chicago miniature— NE-2H |

Figure 5:
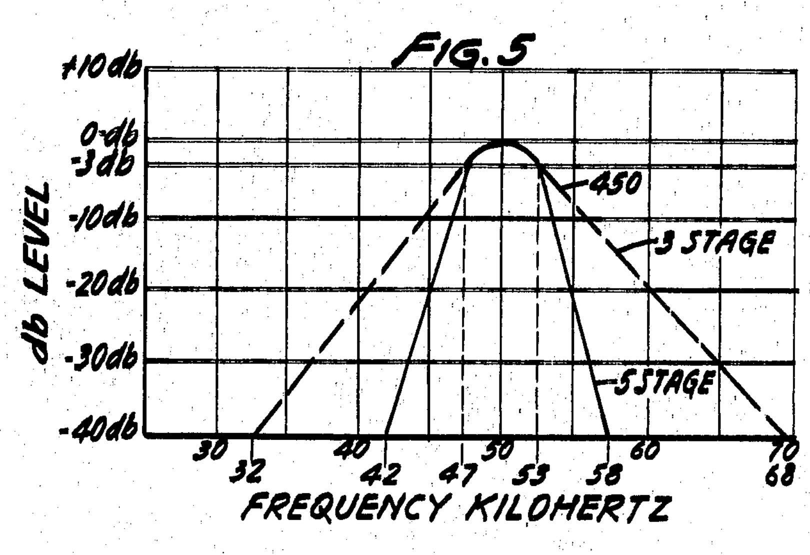
FIG. 5 is a graph illustrating the bandwidth response of a narrow band filtering means having 5 resonant stages which is part of the receiver illustrated in FIG. 4 and alternately a filtering means having 3 resonant stages capable of being used in the receiver of FIG. 4.

FIG. 5 is a graph of the power loss in decibels of a signal plotted as a function of frequency for both a three-stage and a five-stage filter network means. From the resulting curve of FIG. 5, it is apparent that, by increasing the number of series and shunt resonant stages in the filtering means, the rejection frequency or the band pass of the filter can be narrowed to make the band pass as limited as possible.

The dashed curve 450 represents the bandwidth characteristic of a filter network means having a three-stage filter comprising at least two shunt resonant stages and at least one series resonant stage connected between and in parallel to the shunt resonant stages and a resistance means electrically connected across the output of the filtering means and in parallel to the shunt resonant stages. By using such a three-stage filter, and assuming that the predetermined frequency or resonant frequency of the various stages is 50 KHz, the 0.707 power level point or −3 db power point gives a bandwidth of ±3 KHz or on the lower side a 47 KHz frequency or on the higher side a 53 KHz frequency. It is apparent that the power level drops off very quickly as a function of frequency. At the −40 db power level point, using the same 50 KHz signal, the frequency bandwidth at this point is 38 KHz. From this characteristic curve, it is apparent that the narrow band pass filtering means substantially rejects electrical signals having a frequency slightly different than the predetermined frequency while selectively passing electrical signals substantially at the predetermined frequency.

By increasing the number of stages to five as illustrated in FIG. 4 for the receiver, the point 0.707 or −3 db power point is substantially the same, that is ±3 KHz. At the −40 db point, the band pass is 16 KHz for a 50 KHz signal. By increasing the number of stages, the skirt or roll-off portion of the curve can be substantially narrowed to a relatively well-defined band pass filter.

Figure 6:
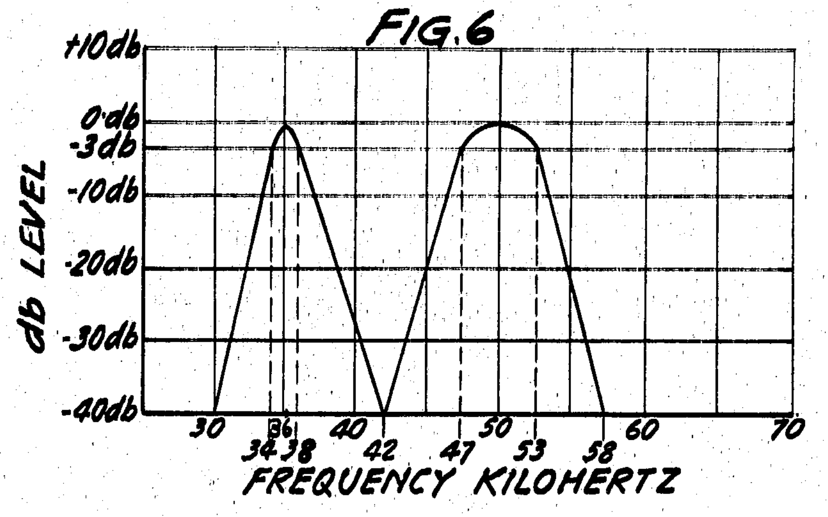
FIG. 6 is a graph illustrating bandwidth response of a multifrequency receiver having at least two narrow band filtering means each having 5 resonant stages.

FIG. 6 is a graph illustrating characteristic curves for two adjacent narrow band pass filtering means each of which has five resonant stages. The selected predetermined frequencies for purposes of illustration are 50 KHz and 36 KHz. For the 50 KHz signal, as illustrated in FIG. 5, the lower limit frequency is 42 KHz. By selecting the next frequency to be 36 KHz, at the −40 db level the bandwidth for the 36 KHz signal is 12 KHz. Thus, the high frequency for the 36 KHz would be 42 KHz. Thus, a receiver containing a narrow band pass filtering means having a resonant frequency of 50 KHz and a second narrow band pass filtering means having a resonant frequency of 36 KHz can concurrently and exclusively respond to its predetermined frequency. Thus, the multifrequency receiver for responding to multifrequency electrical signals impressed onto the electrical distribution system wherein the multifrequency electrical signals are at a frequency other than the carrier frequency of the electrical distribution system is possible by proper filter selection.

Figure 7:
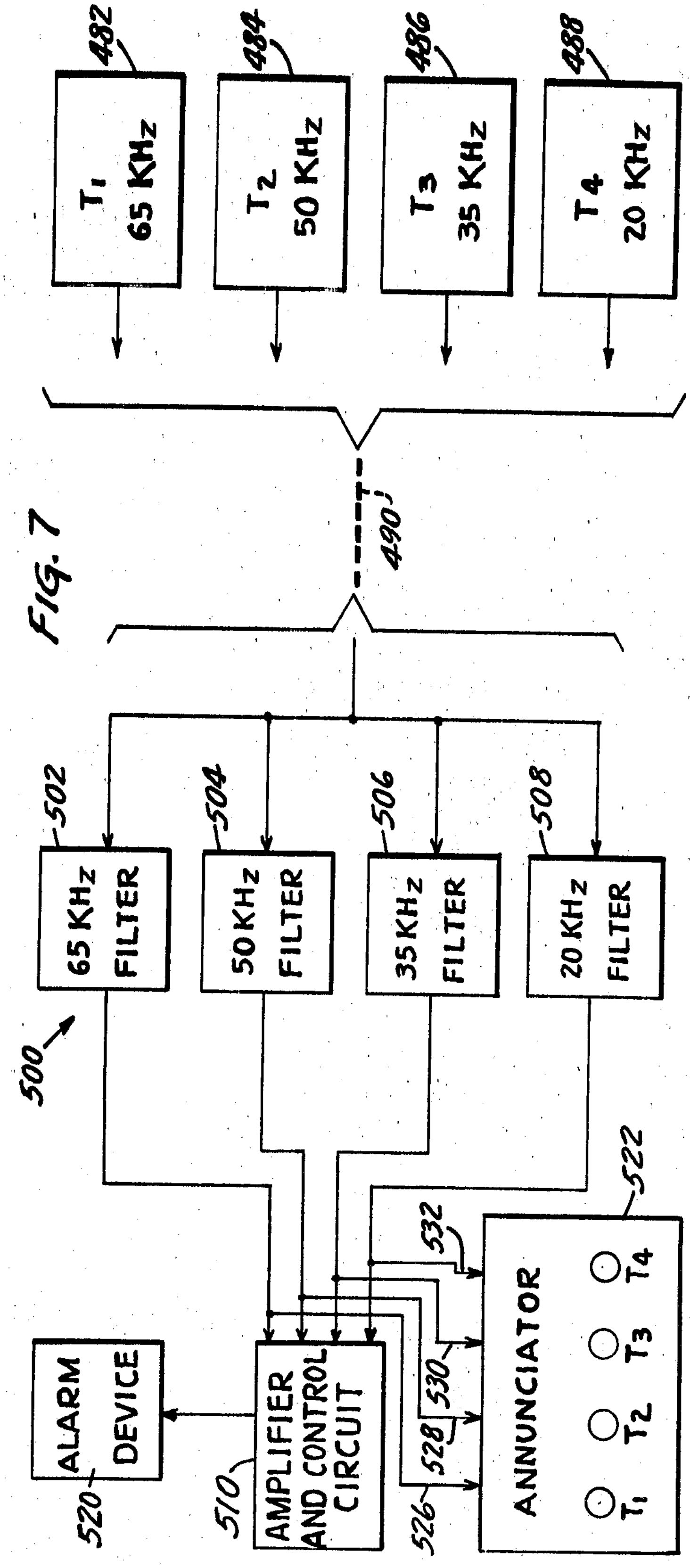
FIG. 7 is a block diagram of a multifrequency communication system utilizing a multifrequency receiver.

FIG. 7 is a block diagram illustrating one possible communication system utilizing a multifrequency receiver. For example, four transmitters each of which has a different frequency can be remotely disposed in different locations. For example, the transmitters could include intrusion detecting means or temperature sensing means for a fire alarm and intrusion system and the transmitter would be actuated in response to detection of a fire or intruder. The four transmitters are shown in block form and are identified by numerals 482 – 488. For example, transmitter 482 can be selected to have a predetermined frequency of 65 KHz, transmitter 484 can be selected to have a frequency of 50 KHz, transmitter 486 can be selected to have a frequency of 35 KHz and transmitter 488 can be selected to have a frequency of 20 KHz. Each of the selected frequencies is such that, at the −40 db level, the minimum frequency of the transmitter having the higher signal is about the same as the maximum frequency of the next transmitter having a predetermined frequency.

When any one of the transmitters 482 – 488 is actuated, or in the event that more than one or all of them are actuated concurrently, the high frequency signal or a multifrequency signal will be impressed onto the electrical distribution system 490. The high frequency signal or multifrequency signal would be applied to a receiver 500 located remotely to the transmitters but energized from the power distribution system 490. The receiver 500 has four narrow band pass filtering means, identified by numerals 502 – 508. For example, filtering means 502 is a 65 KHz filter, 504 is a 50 KHz filter, 506 is a 35 KHz filter and 508 is a 20 KHz filter. When a multifrequency or high frequency signal is applied to the filters 502 – 508, each filter will pass only its predetermined frequency and will reject all other frequencies which are different than its predetermined frequency. When any of the filters 502 – 508 passes an electrical signal at its predetermined frequency, this signal is applied to an amplifier and control circuit 510 which amplifies the signal and actuates an alarm device 520 indicating that one of the transmitters has been actuated.

An annunciator 522 is electrically connected to each of the filters 502 – 508 through conductors 526 – 532 respectively. The annunciator 522 has circuitry contained therein which is responsive to a filtering means passing a signal and in turn lights an indicating lamp on the annunciator indicating the location of the transmitter which was actuated.

As one illustration of operation, transmitters $T_1$ and $T_2$ are capable of being actuated by a temperature sensing device, such as for example a sensor which will actuate the transmitter in the event the ambient temperature reaches or exceeds 135° F. If the temperature sensing means for $T_1$ and $T_2$ are operated concurrently, transmitters 482 and 484 will concurrently transmit a 65 KHz and a 50 KHz signal over distribution system 490 which will ultimately be received by receiver 500. Filters 502 and 504 will each pass the signal at its predetermined frequency and reject the other frequency. The filtering means 502 will pass a 65 KHz signal to the amplifier 510 which amplifier 510 in turn actuates the alarm device 520. Concurrently, the 50 KHz filter 504 would apply the signal to the amplifier and control circuit 510 insuring that the alarm device 520 would be rendered operative. Concurrently, the electrical signal from filtering means 502 will be applied via conductor 526 to annunciator 522 to cause the lamp under the label $T_1$ to be energized indicating $T_1$ was rendered operative. Similarly, the electrical signal passed by the filtering means 502 to the amplifier 510 is conducted via conductor 526 to the annunciator 522 causing the indicating lamp associated with $T_2$ to be energized indicating operation of transmitter $T_2$. Thus, the communication system of the present invention has wide utility for use as a means for indicating multifunction operations of remotely located devices.

Figure 8:
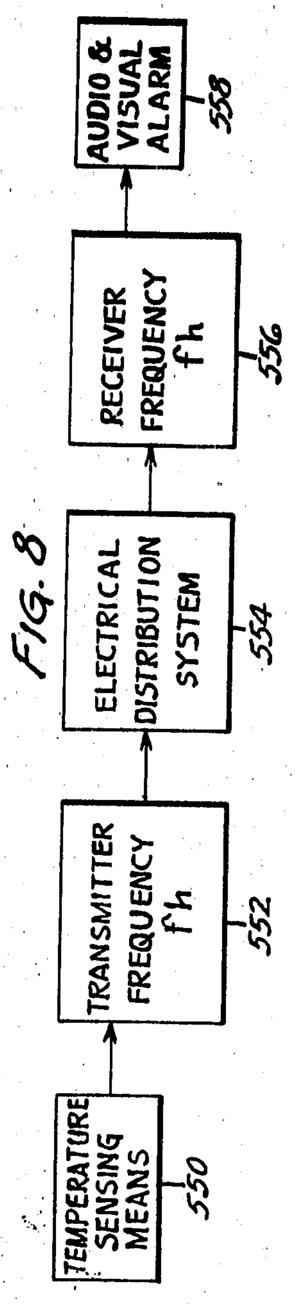
FIG. 8 is a block diagram partially in schematic form of a freezer temperature detecting system utilizing the communication system of the present invention.

One other utility of the communication system of the present invention is as a freezer alarm warning system. FIG. 8 is a block diagram of one embodiment of a temperature sensing system for a freezer. For example, in a private home, the home owner may be unaware that a freezer containing a large quantity of food is not operating properly and if the temperature within the freezer reaches a certain level for a predetermined period of time the food in the freezer would spoil. A similar application of the block diagram of FIG. 8 would be for use in commercial systems, such as for example diary cases, frozen food cases and the like in a store.

Typically, the freezer detecting system would include a temperature sensing device 550 which is located in the area where the temperature is to be monitored. The temperature sensing means 550 could be, for example, a thermistor. The temperature sensing means 550 is connected to a transmitter 552 containing the oscillator which can be actuated by the temperature sensing means 550 sensing that the temperature is at an undesired level. The transmitter 552 when actuated transmits a high frequency signal having a frequency $f_h$ along the electrical distribution system 554 within the building to a receiver 556. The receiver 556 has a filtering means which has a predetermined frequency of $f_h$. When the high frequency signal is received by the receiver 556, an alarm device 558 is actuated. The alarm device 558 may be, for example, a light panel, an audible sounding device and the like. Also, if the temperature sensing means 550 was used in a freezer detection system for a commercial establishment, the alarm device 558 may be a circuit or means for dialing a predetermined number on a telephone for informing the owner or some other party of the inoperative freezer.

Figure 9:
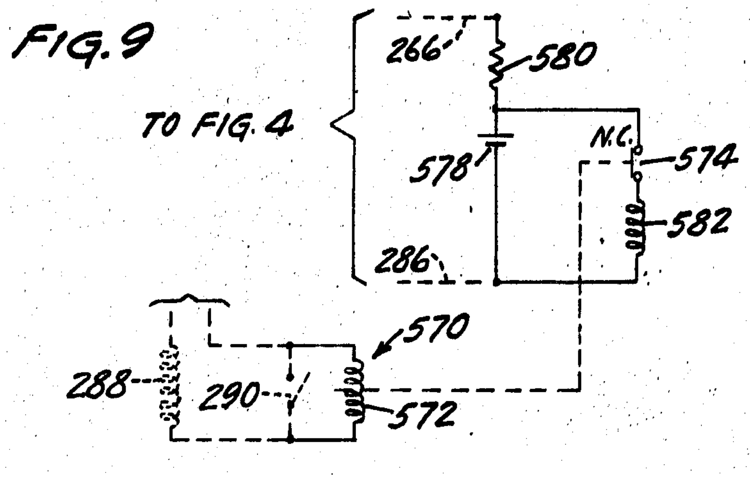
FIG. 9 is a modification of the schematic diagram of the receiver shown in FIG. 4 incorporating a battery and a trouble signal.

FIG. 9 is a modification of the receiver circuitry of FIG. 4 wherein the receiver is provided with a direct current source and a trouble signal for indicating de-energization of the receiver circuitry.

Briefly, the modification includes an additional a.c. relay 570 having a coil 572 which is electrically connected in parallel to the normally-open contact 290 in FIG. 4. The relay 570 includes a normally-closed contact 574. A direct current source, such as for example a battery 578, is electrically connected in series with a current limiting resistor 580 across the power supply conductor 284 and ground conductor 286 of FIG. 4. The normally-closed relay contact 574 is electrically connected to the common junction terminal between battery 578 and resistor 580. The other terminal of normally-closed contact 574 is connected to the coil 582 of a trouble alarm device, the other end of coil 582 being electrically connected to ground conductor 286 of FIG. 4.

When the receiver in standby condition awaiting receipt of a high frequency signal, normally-open contact 290 is in its open position. When contact 290 is in its open position, a low voltage a.c. signal is impressed across and energizes relay coil 572. When coil 572 is energized, the normally-closed contact 574 is held in its open position thereby preventing a direct current voltage from being applied across coil 582. Concurrently, the battery 578 is trickle charged by a current passing from power supply conductor 284 to ground conductor 286 through current limiting resistor 580 and battery 578.

In the event either of the leads to the audible horn coil 288 is open-circuited or intentionally cut, the a.c. voltage appearing across coil 572 is terminated. When this occurs, coil 572 is de-energized permitting the normally-closed contact 574 to move to its closed position. When normally-closed contact 574 is in its closed position, the direct current voltage appearing across battery 578 is applied to the coil 582 of the trouble alarm device causing the same to emit a trouble signal.

Thus, the receiver circuit by the simple modification of FIG. 9 includes means for indicating de-energization of the entire receiver circuit or that there is an open circuit condition in the circuitry energizing the audible horn coil 288. Such a circuit provides a means for meeting Underwriters' Laboratories specifications and providing a supervised multiple station alarm system. In one embodiment, the a.c. relay 570 was selected to have a 100 milliamp coil and a sufficiently high impedance so as not to affect operation of the coil 288 of the audible alarm. The battery 578, in one embodiment, was a 1.5 volt nickel cadmium rechargeable cell and the resistor 580 was selected to be 20 kilohms. The trouble alarm coil 582 was selected to be a 1.5 volt D.C. buzzer having a coil impedance of 10 ohms.

It is readily apparent that the communication system of the present invention has wide utility. Any modifications, improvements and the like are deemed to be within the teachings of the present invention and within the scope of the appended claims.

What is claimed is:

1. In a system for utilizing an electrical signal impressed onto an electrical distribution system wherein said signal has a predetermined frequency other than a carrier frequency of said electrical distribution system, signal responsive means comprising input terminals adapted to be connected to any phase of said electrical distribution system having said electrical signal impressed thereon;

a narrow band pass filtering means having a center bandwidth frequency equalling said predetermined frequency and a predetermined bandpass frequency bandwidth, said filtering means having at least two shunt resonant stages and at least one series resonant stage connected between and in parallel to said shunt resonant stages and a resistance means electrically connected across the output of said filtering means and in parallel to said shunt resonant stages, each of said resonant stages having an inductive element and a capacitive element selected of a predetermined value to establish a resonant frequency equalling said predetermined frequency and a bandpass frequency bandwidth which decreases rapidly as a function of frequency between the −3 db power level point and the −40 db power level point on each side of said predetermined frequency which in combination substantially reject electrical signals having a frequency slightly different from said predetermined frequency while selectively passing electrical signals substantially at said predetermined frequency; and circuit means electrically connected to said filtering means for responding to an electrical signal having a frequency substantially at said predetermined frequency selectively passed by said filtering means.

2. The system of claim 1 wherein said signal responsive means further includes means operatively coupled to said input terminals for passing to said filtering means electrical signals having a frequency in the range of said predetermined frequency with relatively low attenuation and for substantially blocking electrical signals having a frequency in the range of said carrier frequency.

3. The system of claim 1 wherein said filtering means comprises at least a five stage filter including three shunt resonant stages and two single series resonant stages connected between and in parallel to each of said shunt series stages and the inductive element and capacitive element of each resonant stage are selected of predetermined values to establish a bandpass frequency bandwidth at the −40 db power level which varies about twenty percent from the predetermined frequency.

4. The system of claim 3 wherein said filtering means includes a first resistor having a predetermined resistance electrically connected between and in series to said input terminals and said filtering means and wherein said resistance means is a second resistor having the same resistance as said first resistor electrically connected to the output of said filtering means and in parallel to said shunt resonant stages.

In a system for utilizing an electrical signal impressed onto an electrical distribution system wherein said signal has a predetermined frequency other than a carrier frequency of said electrical distribution system, signal responsive means comprising input terminals adapted to be connected to said electrical distribution system;

a narrow band pass filtering means having a center bandwidth frequency equalling said predetermined frequency;

a first resistor having a predetermined resistance electrically connected between and in series to said input terminals and said filtering means;

said filtering means having at least a five stage filter including three shunt resonant stages and two single series resonant stages connected between and in parallel to each of said shunt series stages;

a second resistor having the same resistance as said first resistor electrically connected to the output of said filtering means and in parallel to said shunt resonant stages, each of said resonant stages having a frequency equalling said predetermined frequency which in combination substantially reject electrical signals having a frequency slightly different from said predetermined frequency while selectively passing electrical signals substantially at said predetermined frequency;

a first unilaterally conducting device electrically connected between said input terminal and said first resistor and in parallel to said series resonant stages;

a second unilaterally conducting device electrically connected in parallel to and in a direction opposite to said first unilaterally conducting device, said first and second uni;aterally conducting devices being operative to clamp electrical signals having a potential which exceeds the potential drop across said first and second unilaterally conducting devices; and circuit means electrically connected to said filtering means for responding to an electrical signal having a frequency substantially at said predetermined frequency selectively passed by said filtering means.

6. The system of claim 5 wherein said circuit means includes at least a one stage amplifier operatively connected to said filtering means to receive and amplify said electrical signal having a frequency substantially equalling said predetermined frequency;

a voltage doubling circuit including a capacitor electrically connected to said amplifying means for doubling the amplified signal and for charging said capacitor to a predetermined level in response to said doubled amplified signal; and a switching circuit having a first and second state electrically connected between said voltage doubling circuit and a load, said switching circuit being capable of being switched from said first state to a second state to actuate said load when the charge on said capacitor reaches said predetermined level.

7. In a multifrequency system for utilizing multifrequency electrical signals impressed onto an electrical distribution system wherein said multifrequency electrical signals are separated by a discrete frequency difference and each such electrical signal is at a frequency other than a carrier frequency of said electrical distribution system, signal responsive means comprising input terminals adapted to be connected to any phase of said electrical distribution system having said multifrequency electrical signals impressed thereon;

a plurality of narrow band pass filtering means each having a different preselected center bandwidth frequency corresponding to the frequency of one of said multifrequency electrical signals and a predetermined bandpass frequency bandwidth, each of said filtering means having at least two shunt resonant stages and a series resonant stage connected between and in parallel to said shunt resonant stage and a resistance means electrically connected across the output of said filtering means and in parallel to said shunt resonant stages, each of said resonant stages having an inductive element and a capacitive element selected of a predetermined value to establish a resonant frequency equalling the preselected frequency of its associated filtering means and a bandpass frequency bandwidth which decreases rapidly as a function of frequency between the −3 db power level point and the −40db power point on each side of said preselected frequency which selectively pass electrical signals at substantially the preselected frequency of its associated filtering means while substantially rejecting electrical signals having a frequency slightly different from said preselected frequency of its associated filtering means, and circuit means electrically connected to said plurality of filtering means for responding to any of said electrical signals at substantially the preselected frequency passed by any of said filtering means.

8. The multifrequency system of claim 7 wherein said signal responsive means further includes means operatively coupled to said input terminals for passing to said plurality of filtering means said multifrequency electrical signals with relatively low attenuation and for substantially blocking electrical signals having a frequency in the range of said carrier frequency.

9. The multifrequency system of claim 7 further including an annunciator electrically connected to said plurality of filtering means and responsive to an electrical signal passed by any of said filtering means for indicating which of said filtering means passed said signal.

10. A communication system adapted for use with a building's electrical distribution system comprising means for transmitting a high frequency signal over said electrical distribution system, said transmitting means including means for generating a high frequency signal having a predetermined frequency, means operatively coupled to said generating means for impressing said high frequency signal on said electrical distribution system for modulating the alternating current voltage, and means operatively coupled to said generating means for selectively rendering said generating means operative to impress upon and transmit said high frequency signal over said electrical distribution system, and means operatively coupled to any phase of said electrical distribution system for receiving said high frequency signal when said transmitting means transmits a high frequency signal over said electrical distribution system, said receiving means including a narrow band pass filtering means having a center bandwidth frequency equalling said predetermined frequency and a bandpass frequency bandwidth substantially defined by the −3db power level point on each side of said center bandwidth frequency on a rapidly decreasing roll-off power level characteristic between each −3db power level point and its respective −40 db power level point, said filtering means including at least two shunt resonant stages and a single series resonant stage connected between and in parallel to said shunt resonant stages and a resistance means electrically connected across the output of said filtering means and in parallel to said shunt resonant stages, each of said resonant stages having passive elements and a center bandwidth equalling said predetermined frequency, said filtering means being capable of passing said high frequency signal with minimum attenuation and passing all other signals with substantial attenuation whereby the signal-to-noise ratio of the passed high frequency signal is substantially greater than that of the received high frequency signal, amplifying means operatively coupled to said filtering means for amplifying said passed high frequency signal, and circuit means operatively coupled tp said amplifying means and responsive to an amplified high frequency signal for actuating an output device.

11. The communication system of claim 10 further including temperature sensing means capable of being actuated at a predetermined temperature level electrically connected to said transmitting means for starting said high frequency signal generating means when the ambient temperature in the vicinity of said temperature sensing means reaches a predetermined temperature level; and wherein said output device is an alarm means for indicating actuation of said temperature sensing means.

12. The communication system of claim 10 further including intrusion detecting means capable of being actuated when any one of an object, person and the like is detected in the vicinity of said intrusion detecting means for starting said high frequency signal generating means when said intrusion detecting means is actuated; and wherein said output device is an alarm means for indicating actuation of said intrusion detecting means.

13. The communication system of claim 10 further including means including a rechargeable battery operatively connected to said receiving means for charging said battery to a predetermined charge level when said electrical distribution system energizes said receiving means and for supplying a direct current voltage to said receiving means when said electrical distribution system is de-energized.

14. The communication system of claim 13 wherein said receiving means includes a supervisory control circuit including a trouble annunciator for indicating at least one of said receiving means being energized from said battery and said output device being incapable of responding to said circuit means.

* * * * *